US 8,131,115 B2

(12) United States Patent
Meijers

(10) Patent No.: US 8,131,115 B2
(45) Date of Patent: Mar. 6, 2012

(54) METHOD FOR ALIGNING SCANNED IMAGE ELEMENTS

(75) Inventor: Marc M. J. Meijers, Eindhoven (NL)

(73) Assignee: Oce-Technologies B.V., Venlo (NL)

( * ) Notice: Subject to any disclaimer, the term of this patent is extended or adjusted under 35 U.S.C. 154(b) by 877 days.

(21) Appl. No.: 12/216,210

(22) Filed: Jul. 1, 2008

(65) Prior Publication Data
US 2009/0010566 A1 Jan. 8, 2009

(30) Foreign Application Priority Data
Jul. 2, 2007 (EP) .................... 07111550

(51) Int. Cl.
G06K 9/32 (2006.01)
(52) U.S. Cl. .............. 382/294; 700/57; 700/58
(58) Field of Classification Search ............. 347/116; 348/263, 745, E9.007; 356/138, 139.34, 356/150, 401, 490, 508; 101/481; 382/184, 382/287, 294; 700/57, 58, 59
See application file for complete search history.

(56) References Cited

U.S. PATENT DOCUMENTS
5,483,606 A * 1/1996 Denber .............. 382/294
(Continued)

FOREIGN PATENT DOCUMENTS
EP 1 100 257 A1 5/2001
(Continued)

OTHER PUBLICATIONS
Anonymous: "Precise Page Positioning (PPP) for Scanned Images", Internet Citation [Online], Sep. 18, 2000, XP002367313, Retrieved from the Internet: URL: http://web.archive.org/web/20000918133519/http://www.elan-gmk.com/brochures/PPP_brochure_4pg_lr.pdf>[retrieved on Feb. 10, 2006].*
(Continued)

Primary Examiner — Gregory F Cunningham
(74) Attorney, Agent, or Firm — Birch, Stewart, Kolasch & Birch, LLP

(57) ABSTRACT

For aligning two or more image elements on separate pages, a position of a common part of the image elements is determined relative to a predetermined reference position. The image elements are then shifted with respect to the reference positions such that each image element has substantially the same position relative to the reference position. The reference position may be determined relative to a page on which the image elements are to be printed. Contents of the image elements can be displayed superposed to enable a user to consider alignment and/or determine whether a common image part is present.

20 Claims, 2 Drawing Sheets

U.S. PATENT DOCUMENTS

| | | | |
|---|---|---|---|
| 5,666,208 A | 9/1997 | Farrell et al. | |
| 5,760,912 A | 6/1998 | Itoh | |
| 6,434,279 B1 * | 8/2002 | Shiba | 382/294 |
| 2005/0220363 A1 * | 10/2005 | Oldroyd | 382/294 |
| 2006/0061777 A1 * | 3/2006 | Duggan et al. | 358/1.1 |

FOREIGN PATENT DOCUMENTS

EP            1 460 557 A2     9/2004

OTHER PUBLICATIONS

Anonymous: "Precise Page Positioning (PPP) for Scanned Images", Internet Citation [Online], Sep. 18, 2000, XP002367313, Retrieved from the Internet: URL:http://web.archive.org/web/20000918133519/http://www.elan-gmk.com/brochures/PPP_brochure_4pg_Ir.pdf>[retrieved on Feb. 10, 2006].

* cited by examiner

METHOD FOR ALIGNING SCANNED IMAGE ELEMENTS

CROSS-REFERENCE TO RELATED APPLICATIONS

This application claims priority under 35 U.S.C. §119(a) to Application No. 07111550.5, filed in Europe on Jul. 2, 2007, the entirety of which is expressly incorporated herein by reference.

BACKGROUND OF THE INVENTION

1. Field of the Invention

The present invention relates to a method for aligning a first and a second image element with respect to a reference position. In particular, the image elements may be scanned document pages.

2. Description of Background Art

When a document, in particular a document having multiple pages, is scanned, the scanned images may be shifted and/or rotated. If the document is then printed again, the pages may be displaced with respect to each other. A user, i.e. a person reading the printed document, may find the displaced pages disturbing.

In U.S. Pat. No. 5,666,208, a method and system is disclosed for registering or aligning a front page and a back page of a page to be printed. Therefore, the front page and the back page are displayed with a transparent background and superposed with respect to each other. A user may shift the front page or back page such that the front page and the back page are aligned, or at least registered in a way that is desired by the user.

In the above-mentioned method and system, a user, i.e. an operator of the system, is required to manually shift the front page or back page. In particular, if a document comprises a relatively large number of pages, this requires a relatively large amount of time. Further, only the front page and the back page of a single page may be aligned with respect to each other. Thus, if a document comprises two or more pages, it is not possible to align the separate pages with respect to each other.

SUMMARY OF THE INVENTION

It is an object of the present invention to provide a method for aligning multiple pages with respect to each other.

The above object is achieved in a method for automatically aligning a first digital image element and a second digital image element, each of the first and second image elements comprising a substantially same image part, the method comprising the steps of determining a relative position of the image part in the first image element relative to a first reference position; determining a relative position of the image part in the second image element relative to a second reference position, the second reference position being associated with the first reference position; and shifting the second image element relative to the second reference position such that the position of the image part of the second image element relative to the second reference position is substantially the same as the position of the image part of the first image element relative to the first reference position.

In the method according to the present invention, a first image element and a second image element are to be aligned. The first image element and the second image element may be scanned document pages, for example. However, the image elements may as well be separate documents and/or the image elements may be objects other than a document page. For example, the image elements may be images, text documents or any other digital object.

Each image element comprises a substantially same image part. For example, in a document comprising multiple pages, each page may be provided with a substantially same object having a substantially same position on each page. Such an object may be a logo, for example. The present invention advantageously employs the presence of such a common object. Therefore, the method comprises the steps of determining a position of the common image part in each image element.

The position is determined relative to a reference position. For example, the reference position may be a predetermined imaginary point or the reference position may relate to another object. For example, the reference position may relate to a document page, in particular the reference position may be related to an edge of a page. Thus, such a reference position may or may not be linked to any physical property of a page or the image element. In order to enable alignment of a number of image elements, a reference position is not linked to the respective image element or the corresponding image part. Thus, if the document is later printed, the reference position may be used to align the image elements with respect to the pages on which they are printed such that each image element is printed at a substantially same position on each page. Of course, in order to enable suitable alignment of the image elements, the reference positions for each image element are associated such that if the image elements have a same position relative to their respective reference position, the image elements are aligned.

Since the common object, i.e. the substantially same image part, is intended to have a substantially same position in each image element, each image element is shifted such that the position of each image part relative to the respective reference position is substantially the same for each image element. Therefore, according to the present invention, the image elements are aligned with respect to the respective reference positions.

In an embodiment, the image part is selected from the image element. Selecting the image part may be performed by a user or may be performed automatically by a suitably programmed computer processing device. Automatic selection by a computer processing device may be performed by comparing the first and the second image elements in order to determine substantially same or similar image parts. Any image part present in each image element may be employed in a method according to the present invention as the common image part.

If the user is to select the image part, the first image element may be displayed on a display device, such as a computer monitor, such that the user is enabled to view the image element and to indicate the image part. It is noted that the user may indicate the image part or may indicate an image area comprising the common image part. In the latter case, the computer processing device may determine the common part in the selected image area. The processing device may apply any kind of suitable algorithm on the selected area in order to determine the relative position of the common image part.

In an embodiment, not only the first image element is displayed, but two or more or possibly all image elements are displayed superposed with respect to each other. Therefore, an image content of each image element is separated from an image background. Then, each image content is displayed superposed with respect to the other image contents, wherein the respective reference positions are positioned such that they coincide. Thus, it may be easily detected whether alignment is desired and/or whether a common image part is present. Advantageously, selection of the common image part may be performed in such a stacked view. In an embodiment, one of the image contents may be selected and highlighted, for example by assigning a different color, thereby enabling to determine which image element is shifted over a relatively large distance compared to other image elements or to determine which image element is positioned correctly such that the other image elements may be shifted to a position corresponding to the correctly positioned image element.

As mentioned above, a user may indicate an image part area comprising a common image part. A computer processing device may apply an algorithm to determine the position relative to the reference position. In an embodiment, the computer processing device may determine a largest group of image pixels in the common image part area. Then, the computer processing device may determine a reference point of said largest group of pixels and determine the relative position of the reference point with respect to the reference position. Such a reference point of the largest group of pixels may be a geometrical center of the group, a position of an upper left pixel of the group, or any other suitable reference point of the group.

In an embodiment, a predetermined object having a predetermined shape is provided and the computer processing device examines the image part area in order to find the predetermined object in the indicated image part area, for example by applying correlation techniques and/or pattern recognition techniques, as known in the relevant art. Then, a reference point is determined and a relative position of the reference point with respect to the reference position is determined, as described above. The predetermined object may be provided by a user, for example as a separate image, or the predetermined object may be retrieved from one of the image elements. In an embodiment, the computer processing device may be configured to determine and select a suitable common image part from the provided image elements automatically, e.g. by comparison of said provided image elements.

The present invention may be applied to a set of a first and a second image element, but may as well be applied to three or more image elements. If more than two image elements are used, all image elements may be aligned with respect to a first image element or each image element may be aligned with respect to a preceding image element, provided that the preceding element has been aligned previously.

Moreover, if not all pages comprise a common image part, but if two subsets of image elements are present, each subset comprising a common object, each subset may be aligned using the common image part. The subsets may be aligned with respect to each other by aligning an image element that is part of both subsets. In other words, the image elements of a first subset may be aligned first. Then, in the first subset, an image element is selected, which image element is also a member of a second subset. Then, using the selected image element, the other image elements of the second subset are aligned with respect to said selected image element, thereby aligning the image elements of the second subset with respect to the first subset.

In an embodiment, two or more reference points and corresponding positions relative to the respective reference positions are determined from each image element. Using multiple relative positions enables shifting, rotating and/or scaling of the image elements. The multiple relative positions may be determined from a single image part or may be determined from multiple common image parts.

The relative position of the image part with respect to the reference position may be determined as a relative position of the reference point of the image part with respect to a corner of a reference frame (provided that the selected frame has such a corner). For example, if the reference position coincides with an edge of a page, the page edge may be regarded as a reference frame and the relative position may be determined with respect to an upper left corner of the page. In another embodiment, the relative position may be determined with respect to two opposing sides of such a reference frame, allowing centering of the image element between said opposing sides of the reference position. For example, in many documents, a page number is centered. Thus, by selecting the page number as a common image part, the first image element may be aligned by centering the page number, while the second and further image elements may be aligned with respect to the first image element.

In an aspect, the present invention provides a computer program on a computer readable medium. The computer program comprises computer readable instructions for instructing a computer to perform the method according to the present invention.

In a further aspect, the present invention comprises a computer processing system configured for performing the method according to the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1A:
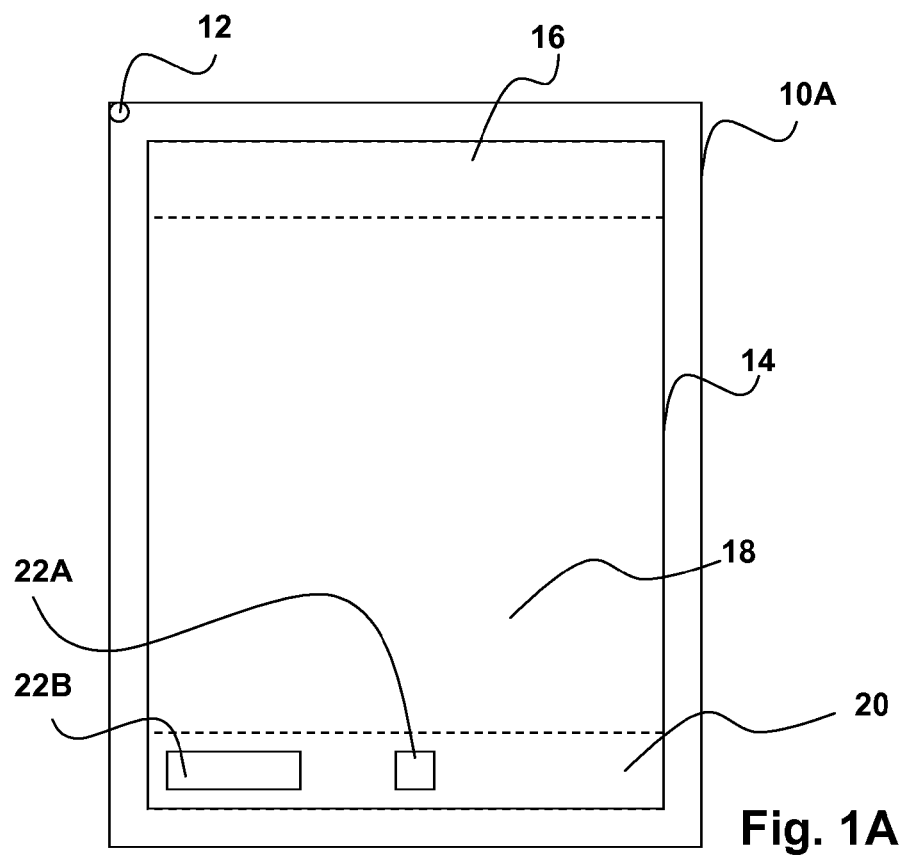
FIG. 1A shows a first document page.

The present invention will now be described with reference to the accompanying drawings, wherein the same reference numerals have been used to identify the same or similar elements throughout the several views.

FIG. 1A shows an exemplary first document page 10A. An upper left corner 12 of an edge of the first document page 10A is selected as a reference position for alignment according to the present invention as hereinafter described. It is noted that the selection of the reference position 12 is arbitrary and any other position not relating to a content of the first document page 10A may be suitably selected.

A document content 14 is provided on the first document page 10. The illustrated document content 14 comprises a header 16, a content area 18 and a footer 20. The content area 18 may comprise text and/or images. The header 16 and the footer 20 may comprise any kind of text and/or images, but, in practice, the header 16 and/or the footer 20 may comprise a page number 22A, a publication date 22B, an author name, a company name, a company logo, a chapter title, a document title, and/or any other general information relating to the document.

The first document page 10A comprises the content 14. The content 14 is illustrated as being smaller than the document page 10A. As such, the illustrated document page 10A may be regarded as a background of the document page 10A. However, in general and as used herein, the content 14 comprises all text, images, and other objects that contain information and that are to be aligned. The background as used herein does not comprise information and/or is not to be aligned. For example, if the document page 10A is a scanned document, the original document being a white piece of paper with text, images and/or other objects printed thereon, the content 14 is presented and displayed superposed on a white surface. In such an example, the background as used herein is the white surface, whereas all text, images, and other objects are the content 14. It is noted that a background, in a conventional meaning, may comprise a watermark and/or other image, for example. As used herein, such a watermark or other image may be part of the content 14.

Figure 1B:
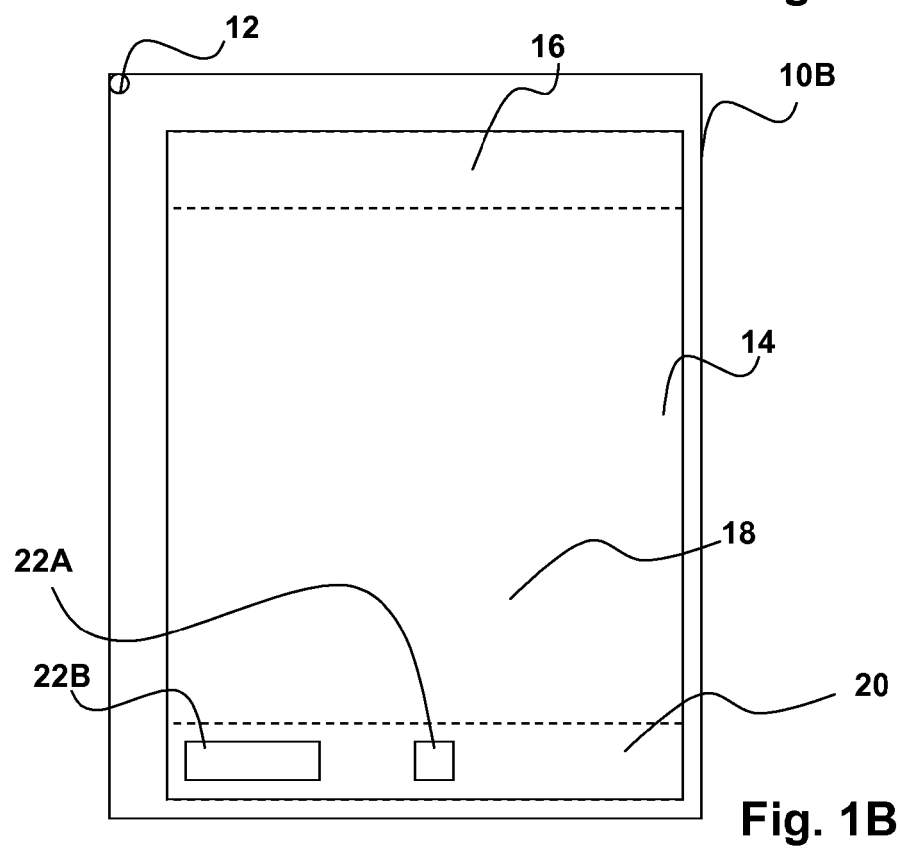
FIG. 1B shows a second document page.

FIG. 1B shows a similar second document page 10B. In particular, the first document page 10A and the second document page 10B are assumed to be comprised in the same document. Therefore, the header 16 and the footer 20 are assumed to be substantially the same. As an exception, the page numbers 22A are, of course, different, although the layout of the page numbers 22A are the same. The publication date 22B on each document page 10A, 10B is the same.

As is evident from the drawings, the position of the content 14 of the first document page 10A relative to the document page 10A is different compared to the position of the content 14 of the second document page 10B. Such a difference may have been caused by scanning the document, for example. However, if the scanned document is printed again, it is desirable that each content 14 has a substantially same relative position on the respective document pages 10A, 10B.

Figure 2:
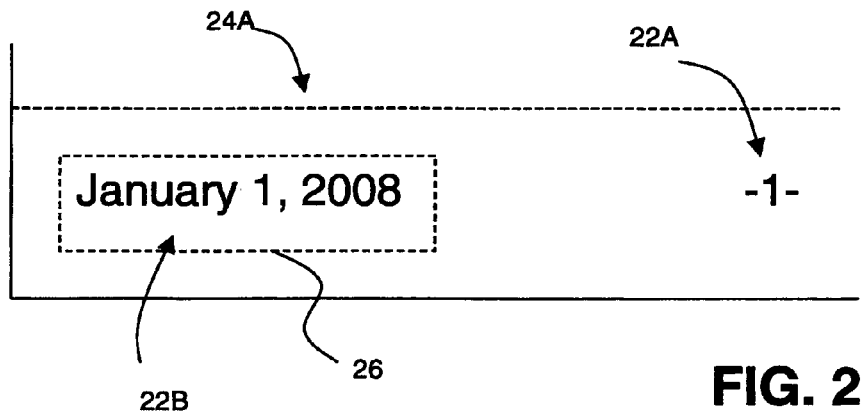
FIG. 2 shows a common image part of the first and the second document pages according to FIGS. 1A and 1B.

FIG. 2 shows an image part 24A of the first document page 10A. The illustrated image part 24A is a part of the footer 20, comprising the page number 22A and the publication date 22B. A substantially same image part is present in the second document page 10B, except that the page number 22A is different, e.g. "2." Therefore, the image 24A may be regarded as a common image part 24A.

Figure 3A:
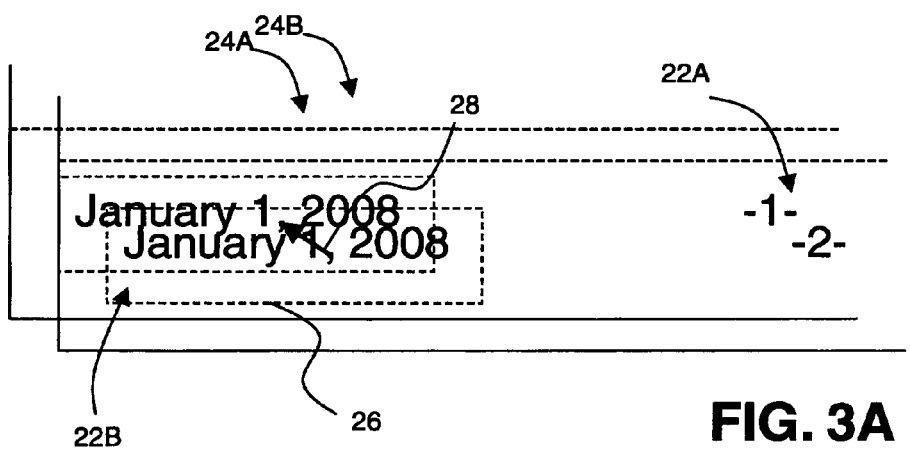
FIG. 3A shows a stacked view of the common image parts of the document pages according to FIGS. 1A and 1B before alignment.

FIG. 3A shows the common image part 24A of the first document page 10A (FIG. 1A) and the substantially same common image part 24B of the second document page 10B (FIG. 1B). The presumably white background of the document pages 10A and 10B have been removed and the content of the image parts 24A, 24B have been superposed, i.e. displayed on top of each other. The positions relative to the respective reference positions 12 are maintained. Thus, it is clearly visible that the common image parts 24A, 24B have a different relative position, and thus that each corresponding image element, in particular each respective content 14, has a different position relative to the respective document page 10A, 10B.

In order to align the document pages 10A, 10B with respect to each other, in accordance with the present invention, a difference in the relative positions of the image parts 24A, 24B is determined. A relative position of the first image part 24A with respect to the reference position 12 of the first document page 10A is determined and a relative position of the second image part 24B with respect to the reference position 12 of the second document page 10B is determined.

The relative positions may be determined based on a common feature of the image parts 24A, 24B. For example, a user may indicate an image part area 26. A computer processing device may then apply a predetermined algorithm to define a reference point. The algorithm may comprise evaluating the image part area 26 to determine a largest object by determining a largest group of pixels. A reference point may then be a geometrical center of such a group of pixels. However, any other suitable algorithm may be employed as well. The user may of course only select an area comprising only one object, in which case the above-described algorithm may result in more reliable results. As an example, a shift required for alignment is indicated by arrow 28 based on a position of a comma in the notation of the publication date 22B.

An area selected by a user, in particular when the area is selected in a stacked view as hereinafter described in detail, may be used to define a search area. The search area may indicate the area in which the common image part may be present in each image element. Thus, a computational power required for performing the method according to the present invention may be reduced.

In an embodiment, image processing may be applied in order to find a common image part in the selected image part area 26 or in the document pages 10A, 10B as a whole. Such image processing may comprise correlation techniques and/or pattern recognition techniques and/or any other suitable techniques. In an embodiment, a user may provide an object, which is similar to the common image part, and the computer processing device may determine a position of the provided object on each image element by image processing.

In an embodiment, considering that the first image element cannot be aligned with a previous or other image element, the first image element may be aligned with respect to the reference position 12. For example, the reference position 12 may be related to two opposing edges of a page, e.g. centered with respect to the opposing edges. As shown in FIG. 1A, the page number 22A may be intended to be centered. In such a case, the first page may be aligned based on the intended position of the page number 22A by shifting the content 14 such that the page number 22A is centered. Of course, any other suitable object having a known intended position may also be used. After aligning the first image element using this method, the second and further image elements may be aligned with respect to the first image element in accordance with the present invention.

Based on the determined relative positions, a difference between the positions of the image parts 24A, 24B is determined. The difference is then employed to shift the second image element, i.e. the second document page 10B, such that the image parts 24A, 24B have the same position relative to the respective reference position 12.

Figure 3B:
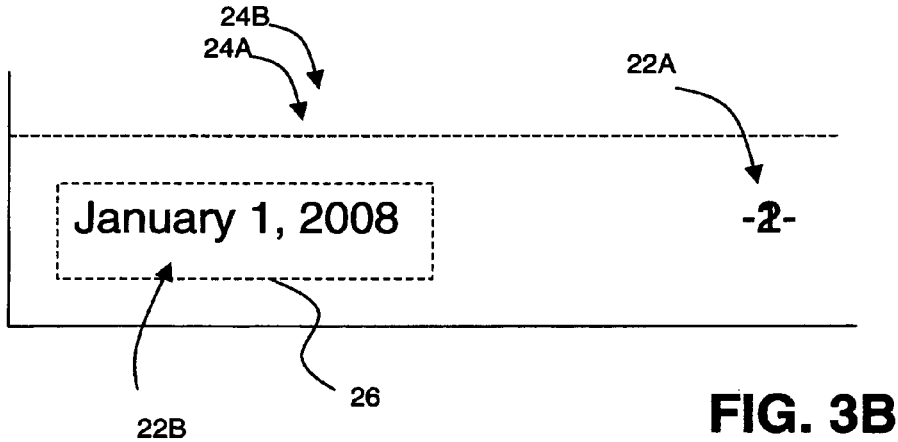
FIG. 3B shows a stacked view of the common image parts of the document pages according to FIGS. 1A and 1B after alignment.

FIG. 3B shows a stacked view of the aligned image parts 24A, 24B, i.e. the image parts 24A, 24B are shown superposed without background. Since the two image parts 24A, 24B have been shifted in accordance with the arrow 28 and are thus aligned, the superposition is only visible by looking at the page number 22A. The page numbers "1" and "2" are clearly visible (although they are superposed).

The stacked view as shown in FIGS. 3A and 3B enables a user to determine whether a common image part, i.e. image parts having at least one common feature, is present in a number of image elements such as documents pages 10A, 10B. In particular, if a relatively large number of image elements need to be aligned, the stacked view may be useful. Moreover, the stacked view may also provide information with respect to the need for alignment. In an embodiment, the content of each image element in the stacked view may be selected and highlighted by displaying the content of said image element in another color. Such a selection enables a user to determine which pages need alignment, which image element may be used as a first image element not requiring alignment and/or which image element may need manual alignment (e.g. since the common image part is lacking), for example.

In an embodiment, multiple reference positions are determined enabling to not only shift the image elements with respect to each other, but to further rotate and/or scale the image elements and/or perform any further operations on the image elements such that the image elements have a same position, orientation, shape and/or size.

In an embodiment, odd and even pages of a document containing multiple pages that are to be printed on a front page and a back page, respectively, may be handled separately. In an embodiment, the odd pages or the even pages may be mirrored before alignment. After alignment, the mirrored pages are mirrored again in order to obtain their original orientation again. One of the above methods or a combination of separate handling and mirroring may be employed depending on the content of the document pages that are to be aligned.

From the above, it is apparent that the present method enables automatic alignment. An embodiment in which two image elements are aligned has been described in detail, but it is apparent to those skilled in the art that the method is suitable for automatically aligning both a relatively small and a relatively large number of image elements, e.g. document pages.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for automatically aligning a first digital image element and a second digital image element, each of the first and second image elements comprising a substantially same image part, the method being performed by a computer processing system comprising the steps of:
   determining a relative position of the image part in the first image element relative to a first reference position;
   determining a relative position of the image part in the second image element relative to a second reference position, the second reference position being associated with the first reference position; and
   shifting the second image element relative to the second reference position such that the position of the image part of the second image element relative to the second reference position is substantially the same as the position of the image part of the first image element relative to the first reference position.

2. The method according to claim 1, wherein the method further comprises the step of selecting the image part.

3. The method according to claim 2, wherein the step of selecting the image part further comprises the steps of:
   displaying the first image element on a display device; and
   selecting by a human operator the image part in the displayed first image element.

4. The method according to claim 3, wherein the first image element comprises a first image content and a first image background, and the second image element comprises a second image content and a second image background and the step of displaying further comprises the steps of:
   taking the first image content from the first image element;
   taking the second image content from the second image element;
   displaying the first image content and the second image content superposed with respect to each other such that the first reference position and the second reference position coincide.

5. The method according to claim 4, wherein the step of displaying further comprises the step of highlighting one of the first image content and the second image content.

6. The method according to claim 2, further comprising the steps of:
   determining by a user an image part area comprising the image part;
   selecting by a computer processing device the image part in the image part area; and
   determining the position of the selected image part relative to the respective reference position by the computer processing device.

7. The method according to claim 6, wherein the step of selecting the image part further comprises the step of determining a largest group of image pixels present in the image part area, and wherein the step of determining the position further comprises the steps of:
   determining a reference point of the largest group of image pixels; and
   determining the position of said reference point with respect to the respective reference position.

8. The method according to claim 6, wherein the image part is a predetermined object having a predetermined shape and the step of selecting the image part further comprises the steps of:
   determining a reference point of the predetermined object in the image part area by comparing the image part area and the predetermined object; and
   determining the position of said reference point with respect to the respective reference position.

9. The method according to claim 8, further comprising the step of providing the predetermined object by a user.

10. The method according to claim 9, further comprising the step of the user indicating the predetermined object in at least one of the image elements.

11. The method according to claim 9, further comprising the step of configuring the computer processing device to determine a suitable object in the first and second image elements by comparing the first and the second image elements.

12. The method according to claim 1, further comprising the steps of:
   determining a relative position of the image part in a further image element relative to a further reference position; and
   shifting the further image element relative to the further reference position such that the position of the image part of the further image element relative to the further reference position is substantially the same as the position of the image part of the first image element relative to the first reference position.

13. The method according to claim 1, wherein each image element is a page of a scanned document.

14. The method according to claim 1, further comprising the steps of:
   determining for each image element at least two reference points relative to the reference position of the respective image element; and shifting and/or rotating and/or scaling at least one of the image elements relative to the respective reference position such that the position and orientation of the image element relative to the respective reference position is substantially the same as the position and orientation of another image element relative to the respective reference position.

15. The method according to claim 14, further comprising the step of determining the at least two reference points from two or more image parts, each image part being present in two or more image elements.

16. The method according to claim 14, further comprising the step of determining the at least two reference points from a single image part.

17. The method according to claim 1, wherein the reference position is a corner of a reference frame.

18. The method according to claim 17, wherein the reference frame is an edge of a page.

19. The method according to claim 1, wherein the reference position is related to two opposing edges of a page.

20. A non-transitory computer readable medium comprising computer readable instructions for instructing a computer to perform a method for automatically aligning a first digital image element and a second digital image element, each of the first and second image elements comprising a substantially same image part, the method comprising the steps of:
determining a relative position of the image part in the first image element relative to a first reference position;
determining a relative position of the image part in the second image element relative to a second reference position, the second reference position being associated with the first reference position; and
shifting the second image element relative to the second reference position such that the position of the image part of the second image element relative to the second reference position is substantially the same as the position of the image part of the first image element relative to the first reference position.

\* \* \* \* \*